United States Patent [19]

Yeh et al.

[11] 4,241,242
[45] Dec. 23, 1980

[54] TELEPHONE HANDSET HOLDER

[76] Inventors: Hsu-Chieh Yeh; Quey-Mei Yeh, both of 1174 Bucknell Dr., Monroeville, Pa. 15146

[21] Appl. No.: 3,622
[22] Filed: Jan. 15, 1979
[51] Int. Cl.³ .............................................. H04M 1/05
[52] U.S. Cl. ..................................................... 179/157
[58] Field of Search ......................................... 179/157

[56] References Cited

U.S. PATENT DOCUMENTS 3,130,276  4/1964  Coviello ............................... 179/157

FOREIGN PATENT DOCUMENTS

| 545080 | 2/1956 | Belgium | 179/157 |
| 552476 | 11/1956 | Belgium | 179/157 |
| 512649 | 2/1955 | Italy | 179/157 |
| 121544 | 4/1948 | Sweden | 179/157 |
| 162859 | 9/1933 | Switzerland | 179/157 |

Primary Examiner—Thomas W. Brown

[57] ABSTRACT

A telephone handset holder adapted to provide a user with maximum comfort when using a telephone without exerting force on the holder against his shoulder. The holder includes a curved member adapted for engagement over the back part of a person's neck, a handset clamp pivotally secured to the front end of the curved member through a sector member, and a leg member pivotally secured to the handset clamp. The holder can be used on either side of a user.

10 Claims, 13 Drawing Figures

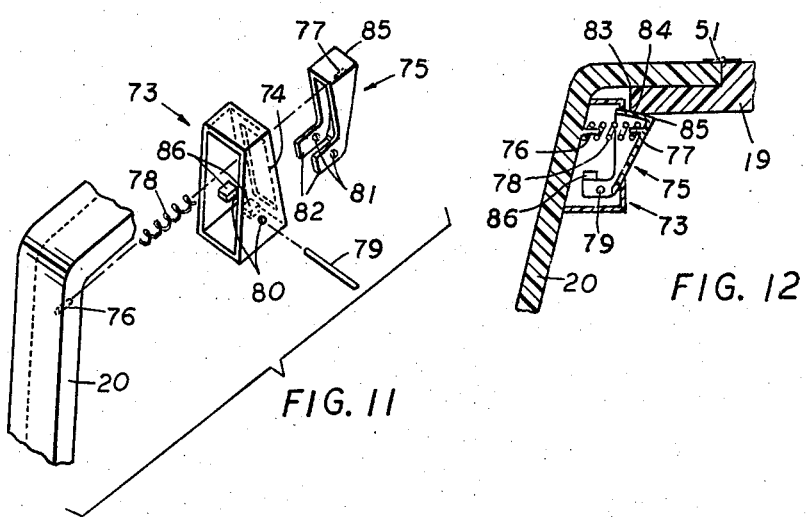

TELEPHONE HANDSET HOLDER

This invention relates to a new novel device for holding a telephone handset, which is constructed based on a new principle while abandons the conventional idea of supporting a telephone handset on the shoulder, to provide a user with maximum comfort when using a telephone.

A number of telephone handset supports have been invented to enable a user to listen and speak over a telephone without using his hand. Most such supports are constructed to hold a telephone handset on a user's shoulder. This is not so comfortable for a user as he must tilt his head and exert a force on the handset support against his shoulder and eventually gets sore neck if the telephone conversation lasts too long.

A primary objective of the present invention is to provide a telephone handset holding device which will allow a user completely free from exerting any force by using a new method of holding a telephone handset, while abandoning the conventional method of supporting a telephone handset on a user's shoulder.

Another objective of the present invention is to provide such a handset holder which can be manually converted for the use on the left or the right side of a user as he desires.

A further objective is to provide a telephone handset holder which may be easily installed on or removed from a telephone handset without using any tool.

Other objectives and advantages of the present invention will be apparent from the following detailed description and appended drawings, in which:

FIG. 11 is an exploded perspective view of an alternative device for maintaining the curved member in an unfolded operation configuration;

FIG. 12 is the cross-section view of the device of FIG 11; and

Figure 1:
FIG. 1 is a front view of the device embodying the present invention when used on the left side of a user.
Figure 2:
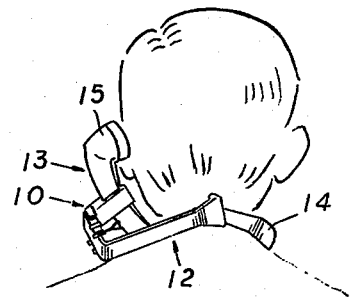
FIG. 2 is a rear view of FIG. 1.

Referring now to FIGS. 1 and 2, the telephone handset holder comprises a handset clamp generally designated by the number 10, a leg member 11, and a curved member generally designated by the number 12. The front end of the curved member 12 is connected to handset clamp 10 which is adapted to secure a telephone handset 13. The rear end of the curved member 12 is an enlarged piece 14 which is adapted to apply on a user's neck. The leg member 11 is connected to the handset clamp 10 and is adapted for resting on a user's upper chest.

Since the principle involved in the present invention is different from the conventional shoulder supported type handset holders, it is necessary to describe the basic principle first in order to have a better understanding as detailed description is carried out. The device utilizes clamping forces to hold a telephone handset in an operation position. Suppose that the handset holder is used on a user's left side (FIG. 1). Said clamping forces are due to the elasticity of the curved member 12 and comprise two sets of forces: the first set of force is exerted by the rear section 14 on the right side back of a user's neck, and the second set of forces, which are opposite to the first set of force, includes the force exerted by the earpiece 15 of a telephone handset 13 on the user's left ear and the force exerted by the foot element 16 of the leg member 11 on the user's upper left chest. Thus a telephone handset is held by the clamping action of the curved member 12 with one force exerted on the right side back of a user's neck and two forces, which are opposite to the first one, exerted on a user's left ear and the upper left chest. The mouthpiece 17 of the telephone handset 13 does not touch the user's mouth. The advantages of the present invention over the conventional shoulder supported type handset holders are apparent as follows:

(1) The conventional shoulder supported type handset holders require a user to exert a force on the telephone handset against this shoulder by tilting his head. The user eventually becomes exhausted or gets sore neck by constantly exerting a force and by this uncomfortable posture. The present invention does not require a user to exert any force. The forces which hold the telephone handset are due to the clamping action of the device, which will not cause any pain to the user if the thickness of the curved member is properly designed to provide a proper flexibility. Therefore the user is completely comfortable and free to do anything he wants while speaking over a telephone.

(2) Since the conventional shoulder type handset holders require a user to exert a force on the mouthpiece of a telephone handset by his chin, he cannot talk over the telephone freely. The present invention completely eliminates this handicap, since with the new device the mouthpiece of the telephone handset does not touch the user's mouth.

Note that the curved member 12 may contact a user's left shoulder to help stabilizing the support. However, this is not the main force of supporting the handset and does not require a user to tilt his head or exert any force against his shoulder.

Figure 3:
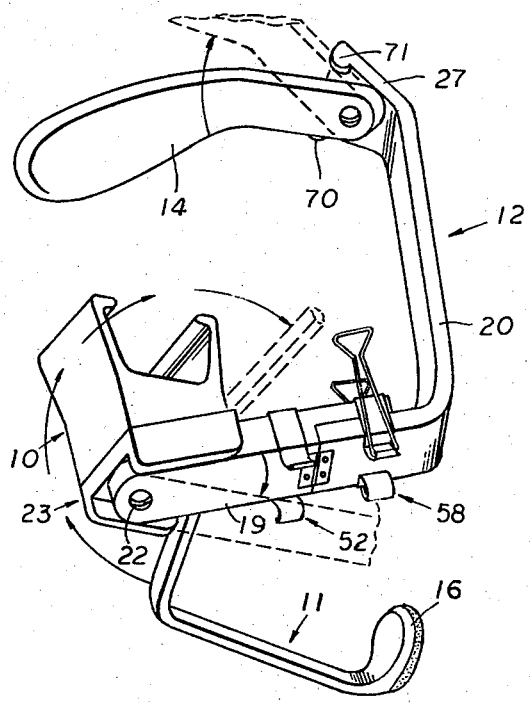
FIG. 3 is a perspective view of the device.
Figure 4:
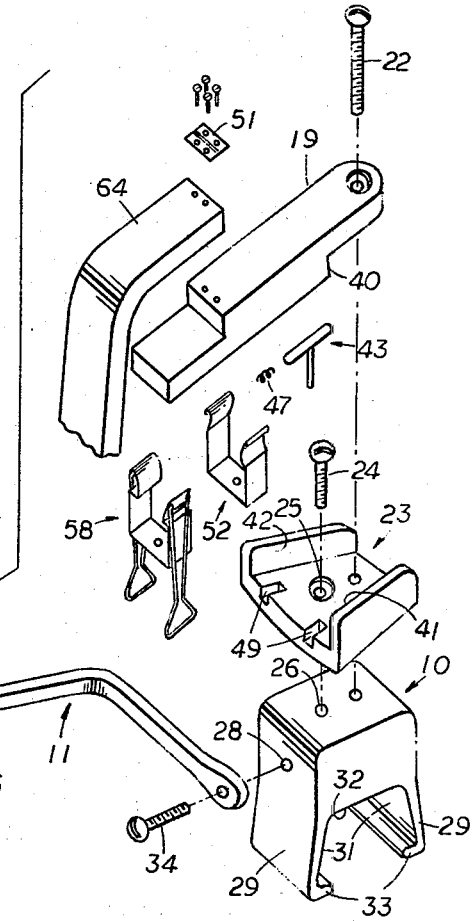
FIG. 4 is an exploded perspective view of the handset holder with a portion of the curved member broken away.

Referring now to FIGS. 3 and 4, the curved member 12 comprises a front section 19, a central section 20, and a rear section 14. The front end of the front section 19 is pivotally secured by a pivot element 22 to a sector member generally designated by 23, which is solidly secured to the handset clamp 10 as integrally therewith on molding or by a screw 24 (FIG. 4) through a hole 25 at the center of the sector member 23, which is counter sunk to enable the head of the screw 24 to seat below the surface of the sector member 23, and affixed to a threaded hole 26 on the handset clamp 10. The rear section 14 of the curved member 12 is pivotally secured to the rear end of the central section 20 at 27. The leg member 11 is pivotally secured to the side wall of the handset clamp 10 at 28 (FIG. 4). Shown by the solid lines in FIG. 3 is the configuration for the use of the present device on the left side of a user. If it is desired to use the device on the right side of a user, the rear section 14, the front section 19 and the leg element 11 would be pivoted in the directions as indicated by arrows to the positions shown by the phantom lines in FIG. 3.

The handset clamp 10 is provided with two jaws 29 (FIG. 4). To fully receive a telephone handset, the shape of the opening formed by the inner walls 31 of the jaws 29 and the back wall 32 substantially corresponds to the shape of the handset shank, and accordingly may be varied in conformity to other handset shapes (not shown). However, the dimension between the two inner walls 31 of the jaws 29 is less than the corresponding dimension between the two side surfaces of the handset shank so as to exert a force on the handset shank and to cause the jaws 29 to firmly engage with the handset shank. The extreme ends 33 are bended slightly inwardly. The thickness of the jaws 29 is such that it provides substantial flexibility for insertion of the handset shank, yet it is strong enough to firmly secure a telephone handset.

Figure 5:
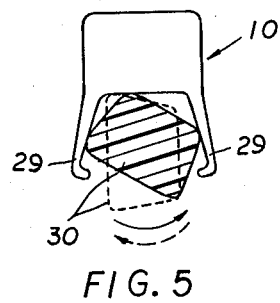
FIG. 5 shows a handset shank rotated in the handset clamp for installing or removing the handset holder on or from a telephone handset.

To install the handset holder on a telephone handset, first the shorter side of the handset shank is inserted into the opening between the jaws 29 as illustrated by the phantom lines in FIG. 5. Then the handset shank 30 is rotated as indicated by the solid arrow in FIG. 5. Due to the flexibility of the jaws 29, the jaws 29 will be pushed outwardly by the handset shank 30 as the handset shank 30 is rotated and eventually fully receives the handset shank 30. The handset holder can be removed from the telephone handset by the reverse procedure, that is, by rotating the handset shank 30 as indicated by the phantom arrow in FIG. 5 and withdrawing it from the opening between the jaws 29. Thus the handset holder can be easily installed on or removed from a telephone handset without using any tool.

Referring to FIG. 4, a leg member generally designated by the number 11 is pivotally attached to a side surface of the handset clamp 10 at 28 with a pivot element 34. On the other end of the leg member 11 is a foot element 16. On the underside of the foot element 16, where contact with the upper chest of a person will take place, is a layer of a sponge-like or rubber material 35 which can be affixed to the underside of the foot element 16 by glue or other adhesive. The length of the leg member 11 is such that when the foot element 16 seats on a user's upper chest the mouthpiece of the handset is in front of the user's mouth as illustrated in FIG. 1. The leg member 11 can be rotated to a second position as shown by the arrow in FIG. 3 for the use of the handset holder on the user's right side.

On the upper surface of the sector member 23, there is formed a divergent channel defined by two side walls 41 and 42. The front portion of the front section 19 has a step change 40 in thickness to accommodate the sector member 23. The front section 19 can be pivoted in the divergent channel about the axis through the pivot element 22. When the handset holder is to be used on a user's left side, the front section 19 is pivoted to cause the side wall 41 to contact with one side of the front section 19, and when the handset holder is to be used on a user's right side, the front section 19 is pivoted to cause the side wall 42 to contact with the other side of the front section 19.

Figure 6:
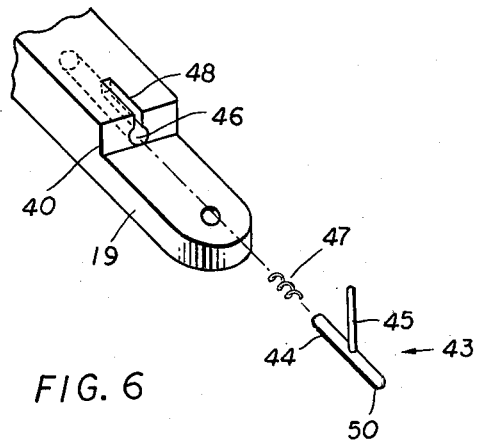
FIG. 6 is a bottom view of the front section of the curved member of FIG. 4 showing a well and a T-shaped element.

To lock the front section 19 at either of these two positions a T-shaped element 43 is provided. Refer now to FIG. 6 which shows the underside of the front section 19. The horizontal arm 44 of the T-shaped element 43 has a diameter larger than the diameter of the vertical arm 45 of the T-shaped element 43. On the underside of the front section 19 is a well 46 which is adapted to house the horizontal arm 44 of the T-shaped element 43 and a coil spring 47 as shown in FIG. 6. A slot 48 is formed on the side wall of the well 46 to accommodate the vertical arm 45 of the T-shaped element 43 so as to allow the horizontal arm 44 of the T-shaped element 43 to slide in the well 46. The width of the slot 48 is smaller than the diameter of the horizontal arm 44 of the T-shaped element 43 and is larger than the diameter of the vertical arm 45. On the upper surface of the sector member 23 two grooves 49 are formed (FIG. 4), which are adapted to accommodate the horizontal arm 44 of the T-shaped element 43. When the front section 19 is at one of the said two positions, the spring 47 inside the well 46 exerts a force on one end 44 of the horizontal arm of the T-shaped element 43 and causes the other end 50 of the horizontal arm to be inserted into one of the grooves 49. Thus the front element 19 is locked at this positions. If it is desired to change the front element 19 from one position to the other, the T-shaped element 43 is pushed toward the coil spring 47 by applying a force on the vertical arm 45 with fingers, and thus withdraw the front end 50 of the horizontal arm 44 from the groove 49. This permits the front section 19 to pivot to the other position.

Figure 7:
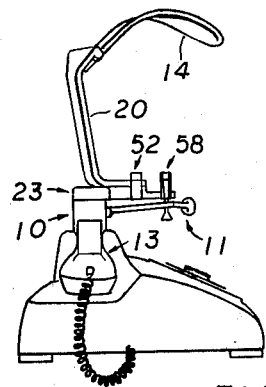
FIG. 7 is a side view of a telephone mounted with the handset holder which is in a folded configuration.
Figure 8:
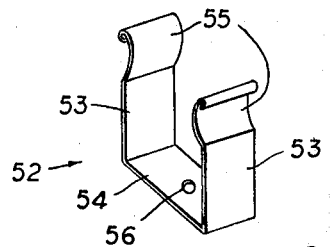
FIG. 8 is a perspective view of the front clip of the curved member.

The front section 19 and the central section 20 of the curved member 12 is connected by a hinge 51 which enables the curved member 12 to be folded in order to permit a telephone handset to rest on the cradle of a telephone while the handset holder is installed on the telephone handset as illustrated in FIG. 7. A front clip generally designated by 52 is provided to retain the curve member 12 in the folded configuration. The front clip 52 may be illustratively formed from sheet steel with U-shaped configuration including two arm portions 53 (FIG. 8) and a cross piece 54. The opening of the U-shaped clip 52 is adapted to accommodate the front section 19. On the end portions of the arms 53 are formed projections 55 extending inwardly for retaining the central section 20 in folded configuration (FIG. 7). The clip 52 is secured by a rivet at 56 of the center of the cross piece 54 to the front section 19.

Figure 9:
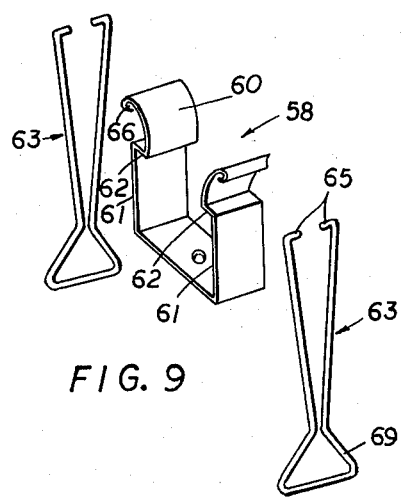
FIG. 9 is a perspective view of the rear clip of the curved member.
Figure 10:
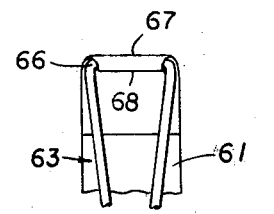
FIG. 10 shows the end portion of one of the two arms of the rear clip.

To retain the central section 20 in the unfolded configuration, another clip 58 is provided, which is secured by a rivet to the rear end of the front section 19. The clip 58 is similar to the clip 52 excepting that two projections 60 (FIG. 9) on the end portions of the arms 61 have flat bottom surfaces 62 and that two handles 63 are provided for releasing the central section 20. When the central section is retained by the clip 58, the upper surface 64 of the central section 20 (FIG. 4) lies snugly below the flat surface 62 of the projections 60. Thus the central section will not be accidentally released from the clip 58 while the handset holder is being used. The handles 63 may be illustratively formed from steel wire. On the upper ends of handles 63 are formed hooks 65 which are adapted to be inserted in the holes 66 at the extrerities of the arms 61. The width of the sheet metal which forms the hole 66 is wider on the top 67 than on the bottom 68 (FIG. 10). This allows the handle 63 to remain in contact on the outer surface of the arms 61. To release the central section 20, the lower portions 69 of the two handles 63 are pushed toward each other with two fingers, which causes the projections 60 on the arms 61 to move outwardly and allows the central section 20 to be released.

FIGS. 11 and 12 show an alternative device for retaining the central section 20 in the unfolded operation configuration. A box 73 is affixed to the central section 20 by glue or screws (not shown). On the outer wall of box 73 is a rectangular hole 74 which is adapted to receive the triangular element 75. A post 76 is formed on the back surface of the central section 20 and another post 77 is formed on the inner surface of the triangular element 75. A spring 78 is placed on the post 76 and the triangular element 75 is inserted into the rectangular hole 74 such that the other end of spring 78 is on the post 77. A shaft 79 is then inserted into the two holes 80 on side walls of box 73 and holes 81 on the two arms 82 of triangular element 75. When the central section 20 is brought into contact with the front section 19 by rotating the central section 20 about the hinge 51, the upper edge 83 of the front section 19 pushes the triangular element 75 into the box 73. As the lower edge 84 of the front section 19 passes the edge 85 of the triangular element 75, the spring 78 pushes the triangular element 75 outwardly and the central section 20 is locked in the unfolded operation configuration. On the inner side surfaces of box 73 two bosses 86 are formed to restrict the triangular element 75 from moving further out. To release the central section 20, the triangular element 75 is pushed into the box 73 and the central section 20 is rotated away from the front section 19 about hinge 51.

At the rear end of the central section 20 of the curved member 12 there are formed two bosses 70 and 71 (FIG. 3) to restrict the angle of pivoting of the rear section 14. When the handset holder is to be used on a user's left side, the rear section 14 is pivoted to the position shown by the solid line in FIG. 3, where the rear section 14 contacts with the boss 70. When the handset holder is to be used on a user's right side, the rear section 14 is pivoted to the position shown by the phantom line in FIG. 3, where the rear section 14 contacts with the boss 71.

The device according to the present invention may be used on either side of a user. If a user desires to switch over from one side to the other, assuming the device is initially in the solid line position of FIG. 3 for the user on user's left side, all he has to do is to pull the vertical arm 45 of the T-shaped element 43 away from the sector member 23 to unlock the curved member 12, to turn the curved member 12 to the dotted line position, to turn the leg member 11 approximately 180°, and to pivot the rear section 14 of the curved member to the dotted line position.

Figure 13:
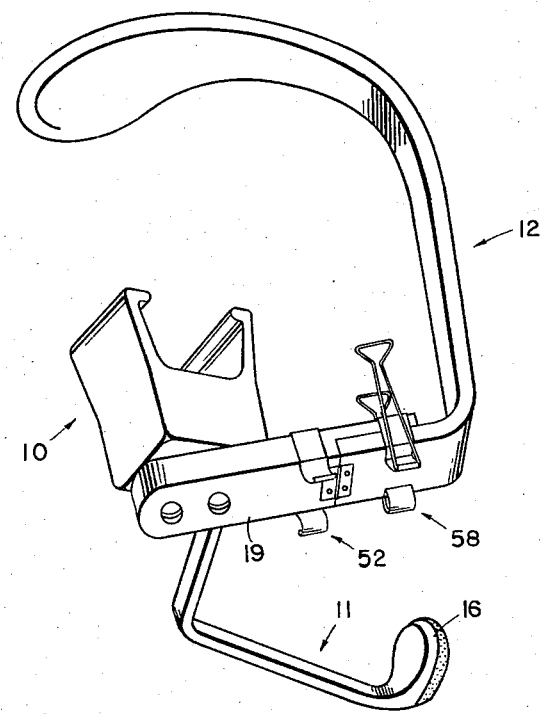
FIG. 13 is a perspective view of the handset holder with the sector member removed and the rear section and the central section molded in one piece for the use on a user's one side only.

If it is only to be used on one side of a user, the sector member 23 can be eliminated and the rear section 14 and the central section 20 of the curved member 12 can be molded integrally as one piece (FIG. 13). This will reduce manufacture cost considerably.

In the foregoing description and associated drawings, we have set forth preferred embodiments of the present invention, however, it will be understood that this invention may be otherwise embodied within the scope of the following claims:

We claim:

1. A telephone handset holder comprising:
   a curved member adapted for engagement over the back of a user's neck,
   a handset clamp adapted for holding a telephone handset,
   means of attaching said handset clamp to the front end of said curved member,
   a leg member including a foot element adapted for resting on a person's upper chest and supporting said handset clamp, being pivotally secured to said handset clamp,
   means of folding said curved member to enable a telephone handset be placed on the cradle of a telephone when the handset holder is installed on the telephone handset, and
   means of maintaining said curved member in an unfolded operation configuration.

2. The invention of claim 1 wherein the said handset clamp comprises a pair of resilient deformable clamping jaws conforming to the contour of a telephone handset shank, and wherein the extremities of the said jaws are bent slightly inwardly, and a telephone handset shank can be inserted into or removed from the opening between said clamping jaws by rotating the telephone handset shank.

3. The invention of claim 2 wherein said curved member comprises a front section, a central section and a rear section, said handset clamp is attached to the front end of said front section, said rear section is attached to the rear end of said central section and is adapted for applying on the back part of a user's neck, on the rear end of said front section is formed a depressed area to accommodate the front end of said central section, said means of folding said curved member includes a hinge which joins said front section and said central section at the front edge of said depressed area, and a clip is provided in front of said hinge to retain said curved member in said folded configuration.

4. The invention of claim 3 wherein said means of attaching said handset clamp to said front section includes
   a sector member which is placed between said front section of said curved member and said handset clamp and is solidly affixed to said handset clamp, said front section of the curved member begin pivotally secured on said sector member and being able to rotate within a divergent channel defined by two unparallel walls which are formed on said sector member, and
   a well and a slot on the underside of said front section of curved member to receive a coil spring and a T-shaped element which is slidably mounted to cause one end of a horizontal arm of said T-shaped element to be inserted into either of two grooves formed on said sector member to lock said front section of the curved member at either of two positions for the present device to be used on either the left or the right side of a user.

5. The invention of claim 4 wherein said rear section of said curved member is pivotally secured to said central section of the curved member to enable the present device be used on either the left or the right side of a user.

6. The invention of claim 3 wherein said front section of said curved member is solidly affixed to said handset clamp, and said rear section and central section of curved member are joined integrally on molding, so that the present device can only be used on one side of a user.

7. The invention of claim 5 wherein said means of maintaining said curved member in an unfolded operation configuration includes a clip affixed to the rear part of said front section of the curved member, said clip having two arms, a cross piece connecting said two arms, and two handles attaching to the extremities of said two arms and lying on the outer surfaces of said two arms, the end portions of said two arms having projections extending inwardly, each said projection having a flat surface such that when said curved member is in said unfolded configuration the upper surface of said central section of the curved member lies snugly below said flat surface.

8. The invention of claim 6 wherein said means of maintaining said curved member in an unfolded operation configuration includes a clip affixed to the rear part of said front section of the curved member, said clip having two arms, a cross piece connecting said two arms, and two handles attaching to the extremeties of said two arms and lying on the outer surfaces of said two arms, the end portions of said two arms having projections extending inwardly, each said projection having a flat surface such that when said curved member is in said unfolded configuration the upper surface of said central section of the curved member lies snugly below said flat surface.

9. The invention of claim 5 wherein said means of maintaining said curved member is an unfolded operation configuration includes a box which is affixed to the inner surface of said central section of the curved member, a triangular element which is inserted into a rectangular hole on the outer wall of said box and is pivotally secured to said box by a shaft, and a spring.

10. The invention of claim 6 wherein said means of maintaining said curved member in an unfolded operation configuration includes a box which is affixed to the inner surface of said central section of the curved member, a triangular element which is inserted into a rectangular hole on the outer wall of said box and is pivotally secured to said box by a shaft, and a spring.

* * * * *